United States Patent
Wang

(10) Patent No.: US 8,528,079 B2
(45) Date of Patent: Sep. 3, 2013

(54) SYSTEM AND METHOD FOR COMBATING PHISHING

(75) Inventor: Tak Yin Wang, Los Altos, CA (US)

(73) Assignee: Yahoo! Inc., Sunnyvale, CA (US)

(*) Notice: Subject to any disclaimer, the term of this patent is extended or adjusted under 35 U.S.C. 154(b) by 420 days.

(21) Appl. No.: 12/269,578

(22) Filed: Nov. 12, 2008

(65) Prior Publication Data
US 2010/0043071 A1 Feb. 18, 2010

Related U.S. Application Data

(63) Continuation of application No. 12/190,346, filed on Aug. 12, 2008.

(51) Int. Cl.
H04L 29/06 (2006.01)

(52) U.S. Cl.
USPC .......................................................... 726/22

(58) Field of Classification Search
None
See application file for complete search history.

(56) References Cited

U.S. PATENT DOCUMENTS

| | | | |
|---|---|---|---|
| 6,907,525 B2 | 6/2005 | Pazi et al. | |
| 7,136,932 B1 | 11/2006 | Schneider | |
| 7,314,167 B1 | 1/2008 | Kiliccote | |
| 7,363,490 B2 | 4/2008 | Paulsen et al. | |
| 7,403,922 B1 | 7/2008 | Lewis et al. | |
| 7,409,708 B2 * | 8/2008 | Goodman et al. | 726/13 |
| 7,422,114 B2 | 9/2008 | Zager et al. | |
| 7,451,487 B2 * | 11/2008 | Oliver et al. | 726/24 |
| 7,461,339 B2 * | 12/2008 | Liao et al. | 715/239 |
| 7,496,634 B1 * | 2/2009 | Cooley | 709/206 |
| 7,506,031 B2 * | 3/2009 | Malik | 709/206 |
| 7,634,810 B2 * | 12/2009 | Goodman et al. | 726/22 |
| 7,739,337 B1 * | 6/2010 | Jensen | 709/206 |
| 7,844,678 B2 * | 11/2010 | Malik | 709/206 |
| 8,291,065 B2 * | 10/2012 | Goodman et al. | 709/224 |
| 2005/0022031 A1 * | 1/2005 | Goodman et al. | 713/201 |
| 2005/0055404 A1 * | 3/2005 | Kitchen, Jr. | 709/206 |
| 2005/0198173 A1 * | 9/2005 | Evans | 709/206 |
| 2005/0289148 A1 * | 12/2005 | Dorner et al. | 707/10 |
| 2006/0070126 A1 * | 3/2006 | Grynberg | 726/22 |
| 2006/0080735 A1 | 4/2006 | Brinson et al. | |

(Continued)

FOREIGN PATENT DOCUMENTS

| | | |
|---|---|---|
| WO | WO2006120368 | 11/2006 |
| WO | WO2006047927 | 11/2006 |
| WO | WO2007007988 | 1/2007 |
| WO | WO2008067646 | 6/2008 |

OTHER PUBLICATIONS

Official Action issued in connection with U.S. Appl. No. 12/190,346 mailed Jul. 6, 2011.

(Continued)

*Primary Examiner* — Oscar Louie
(74) *Attorney, Agent, or Firm* — James J. DeCarlo; Greenberg Traurig, LLP

(57) ABSTRACT

In one embodiment, the present invention relates to a method and system for combating phishing. A computer receives an email comprising a sender email address and a link. The computer determines a sender domain name from the sender email address and ascertains a Uniform Resource Locator (URL) corresponding to the link. The computer then determines a link domain name from the URL. The computer then determines whether the sender domain name is different than the link domain name, so as to classify the URL as a potential phishing URL.

10 Claims, 4 Drawing Sheets

(56) References Cited

U.S. PATENT DOCUMENTS

| | | |
|---|---|---|
| 2006/0101120 A1 | 5/2006 | Helsper et al. |
| 2006/0101334 A1* | 5/2006 | Liao et al. ............. 715/523 |
| 2006/0123464 A1* | 6/2006 | Goodman et al. ............. 726/2 |
| 2006/0123478 A1* | 6/2006 | Rehfuss et al. ............. 726/22 |
| 2006/0129644 A1* | 6/2006 | Owen et al. ............. 709/206 |
| 2006/0184634 A1* | 8/2006 | Owen et al. ............. 709/206 |
| 2006/0200487 A1* | 9/2006 | Adelman et al. ............. 707/102 |
| 2006/0224511 A1 | 10/2006 | Allemann |
| 2007/0033639 A1* | 2/2007 | Goodman et al. ............. 726/2 |
| 2007/0039038 A1* | 2/2007 | Goodman et al. ............. 726/2 |
| 2007/0055749 A1 | 3/2007 | Chien |
| 2007/0094500 A1 | 4/2007 | Shannon et al. |
| 2007/0118528 A1* | 5/2007 | Choi et al. ............. 707/9 |
| 2007/0118904 A1* | 5/2007 | Goodman et al. ............. 726/22 |
| 2007/0198642 A1* | 8/2007 | Malik ............. 709/206 |
| 2007/0245422 A1 | 10/2007 | Hwang et al. |
| 2007/0283000 A1 | 12/2007 | Proux et al. |
| 2008/0028029 A1* | 1/2008 | Hart ............. 709/206 |
| 2008/0028100 A1* | 1/2008 | Adelman et al. ............. 709/245 |
| 2008/0034428 A1 | 2/2008 | Bejar et al. |
| 2008/0052359 A1 | 2/2008 | Golan et al. |
| 2008/0115214 A1* | 5/2008 | Rowley ............. 726/22 |
| 2008/0162449 A1* | 7/2008 | Chao-Yu et al. ............. 707/5 |
| 2008/0163369 A1* | 7/2008 | Chang et al. ............. 726/22 |
| 2008/0256210 A1* | 10/2008 | Malik ............. 709/206 |
| 2009/0077637 A1* | 3/2009 | Santos et al. ............. 726/5 |
| 2009/0300012 A1* | 12/2009 | Levow et al. ............. 707/6 |
| 2010/0042687 A1 | 2/2010 | Wang |

OTHER PUBLICATIONS

Official Action issued in connection with U.S. Appl. No. 12/190,346 mailed Jan. 24, 2011.

Sarwate, Amol , "Winning Against the Phishing Assault", http://www.securecomputing.net.au/Feature/109855,winning-against-the-phishing-assault.aspx, May 2, 2008.

* cited by examiner

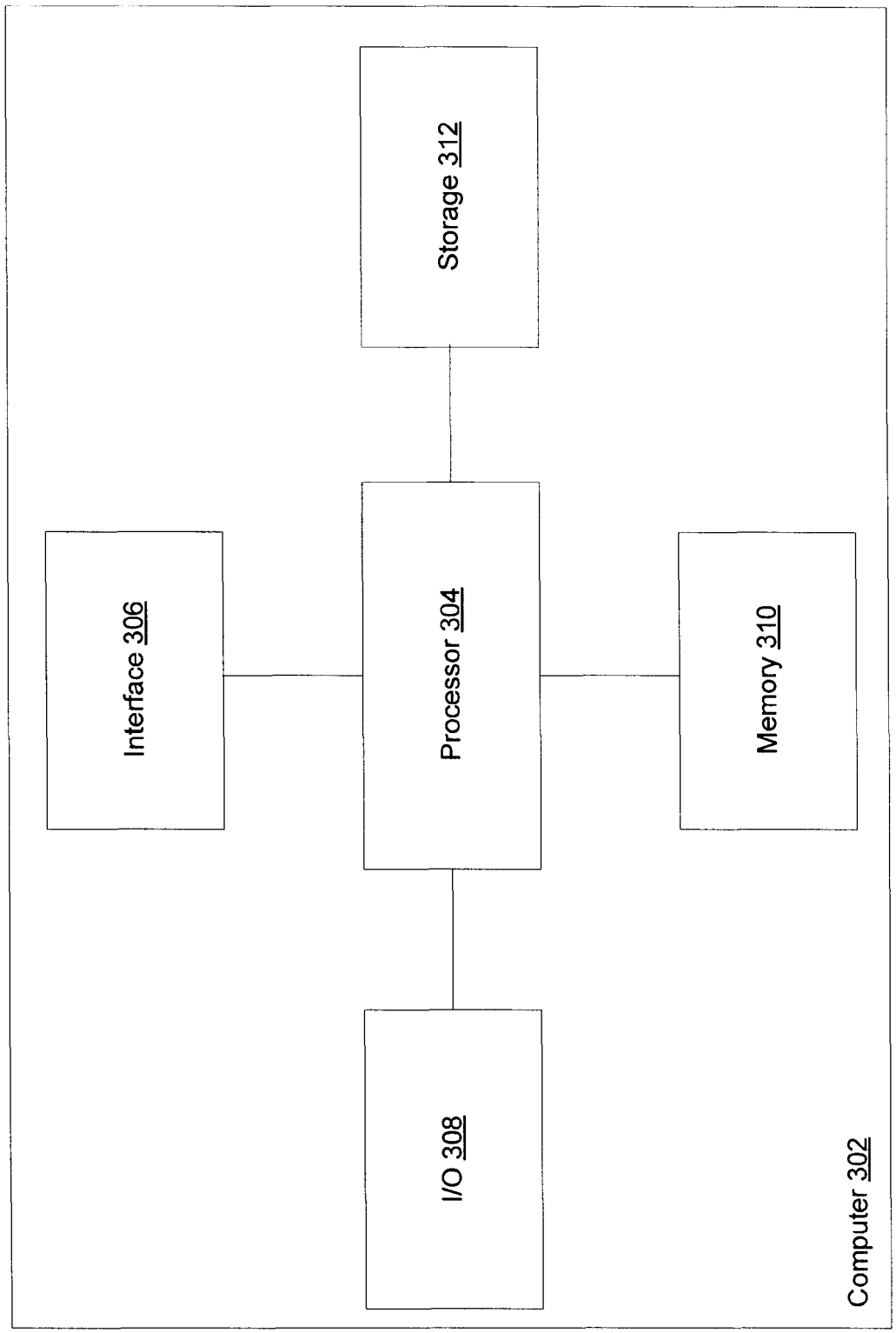

SYSTEM AND METHOD FOR COMBATING PHISHING

CROSS REFERENCE TO RELATED APPLICATIONS

This application is a continuation of and claims the benefit of U.S. patent application Ser. No. 12/190,346, filed Aug. 12, 2008, entitled "System and Method for Combating Phishing".

FIELD

The present invention relates to phishing, and more specifically to a system and methods for combating phishing.

BACKGROUND

In computing, phishing is the process of attempting to acquire sensitive information such as usernames, passwords, and financial information (e.g., credit card details) by masquerading as a trustworthy entity in an electronic communication. Communications purporting to be from financial institutions (e.g., online banks) are commonly used to lure the unsuspecting. Phishing is typically carried out by e-mail or instant messaging, and it often directs users to enter details at a website (e.g., at a login page).

Most methods of phishing use some form of technical deception designed to make a link in an email and the corresponding phishing website that the link leads to appear to belong to an organization's official website. Misspelled Uniform Resource Locators (URLs) or the use of subdomains are common techniques used by phishers. For example, with respect to the URL "http://www.mybank.example.com", it appears as though the URL will take you to the example section of the mybank website. Instead, however, this URL points to the "mybank" (i.e., phishing) section of the example website.

Several problems arise with respect to links in email messages. Users are usually unaware of the legitimacy of the underlying URLs in a link in an email message. Also, it is typically difficult for people to visually differentiate between a phishing website (e.g., login page that is really used to capture someone's username and password) and an official website.

SUMMARY

The present invention provides a system and methods to combat phishing.

In one aspect, a computer receives an email comprising a sender email address and a link. The computer determines a sender domain name from the sender email address and ascertains a Uniform Resource Locator (URL) corresponding to the link. The computer then determines a link domain name from the URL. The computer then determines whether the sender domain name is different than the link domain name, so as to classify the URL as a potential phishing URL.

In one embodiment, the computer checks whether the sender domain name is found in a list of stored domain names. In a further embodiment, the computer determines that the link domain name matches the sender domain name and is found in the stored list of domain names. In one embodiment, the determining whether the sender domain name is different than the link domain name further comprises determining that the sender domain name is not found in the stored list of domain names, determining that the sender email address is not found in an address book associated with the email's recipient email address, and determining that the link domain name does not match the sender domain name and is not found in the stored list of domain names.

The email can be transmitted to a recipient email address. In one embodiment, a sender login page associated with the sender domain name is stored. In a further embodiment, differences between the sender login page and a link login page associated with the link domain name are identified.

In one embodiment, if the recipient of the email clicks on the link, a confirmation web page is transmitted and displayed. This confirmation web page can indicate that the email contains a potential phishing URL, such as by displaying one or more of the differences between the sender domain name and the link domain name, differences between the sender login page and the link login page, a text box, highlighting the potential phishing URL, a suggestion that the recipient go directly to the official website by using a known secure bookmark or by typing in the correct address manually, and/or a checkbox for the recipient to acknowledge that the recipient is taking the risk and responsibility by following the potential phishing URL.

These and other advantages of the invention will be apparent to those of ordinary skill in the art by reference to the following detailed description and the accompanying drawings.

BRIEF DESCRIPTION OF THE DRAWINGS

FIG. 3 is a high level block diagram of a computer in accordance with an embodiment of the present invention.

DESCRIPTION OF EMBODIMENTS

Figure 1:
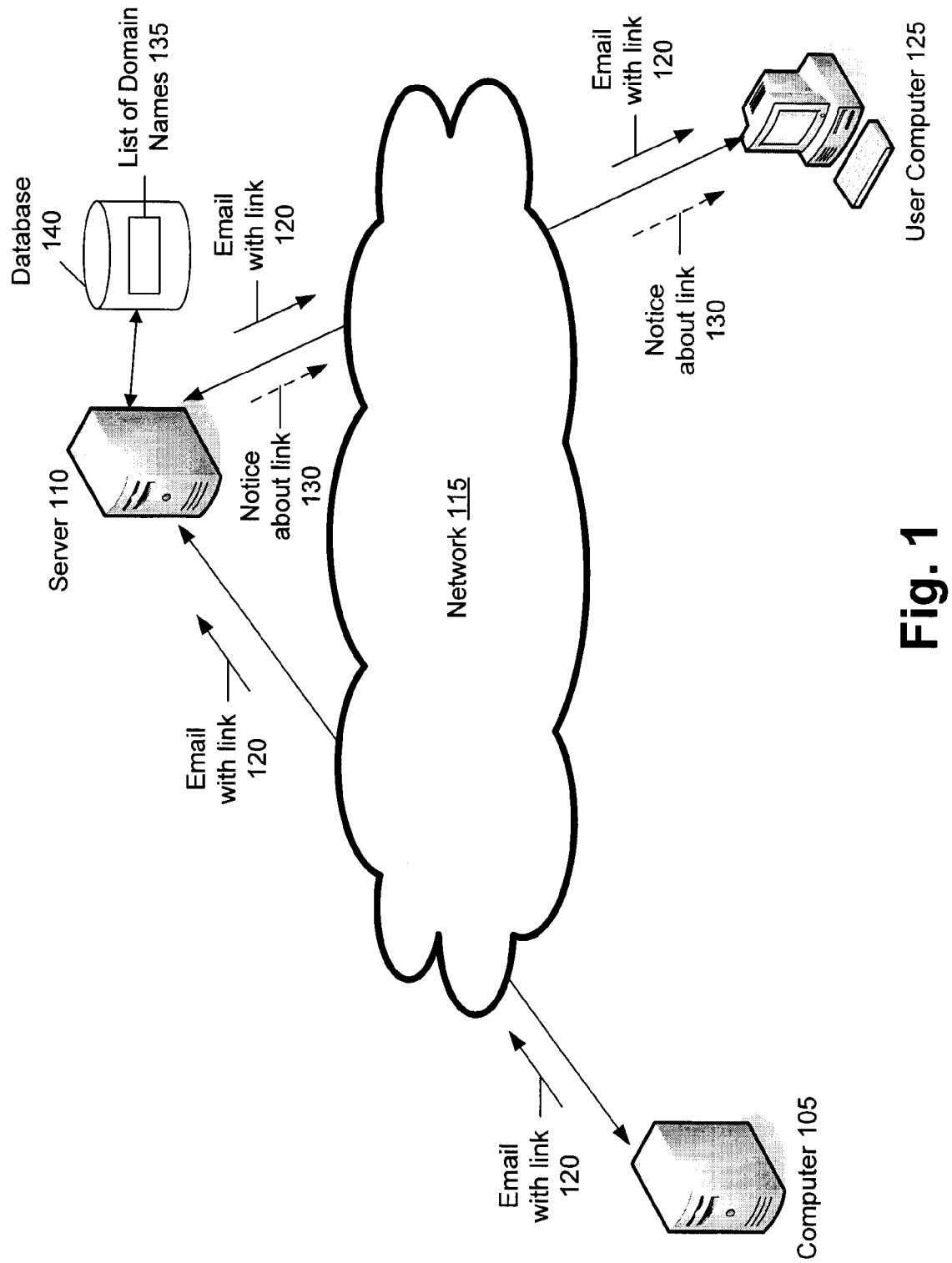
FIG. 1 is a block diagram of a computer transmitting an email containing a link to a server and the server transmitting a notice about the link to a user computer in accordance with an embodiment of the present invention.

The present invention is now discussed in more detail referring to the drawings that accompany the present application. In the accompanying drawings, like and/or corresponding elements are referred to by like reference numbers.

Various embodiments of the present invention are disclosed herein; however, it is to be understood that the disclosed embodiments are merely illustrative of the invention that can be embodied in various forms. In addition, each of the examples given in connection with the various embodiments of the invention is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the present invention.

In one embodiment, and referring to FIG. 1, a computer 105 is in communication with a server 110 over a network 115, such as the Internet. For purposes of this disclosure, a computer such as the computer 105 includes a processor and memory for storing and executing program code, data and software. Computers can be provided with operating systems that allow the execution of software applications in order to manipulate data. Personal computers, servers, personal digital assistants (PDAs), wireless devices, cellular telephones, internet appliances, media players, home theater systems, and media centers are several non-limiting examples of computers.

For the purposes of this disclosure, a server such as the server 110 comprises software and/or hardware executing on one or more computers which receives information requests from other servers or computers, and responds to such requests. A number of program modules and data files can be stored on a computer readable medium of the server. They can include an operating system suitable for controlling the operation of a networked server computer, such as the WINDOWS VISTA, WINDOWS XP, or WINDOWS 2003 operating system published by Microsoft Corporation of Redmond, Wash., or the Ubuntu operating system distributed by Canonical Ldt. of Douglas, Isle of Mann.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to store the desired information and which can be accessed by the computer.

The computer 105 transmits an email 120 to the server 110 over network 115. The email 120 includes a From address indicating who the email was transmitted from and a To address indicating to whom the email is going to be transmitted. In the embodiment shown in FIG. 1, the email 120 is being transmitted from the computer 105 to user computer 125.

The email 120 includes one or more links to a resource, such as a web page or a file. Specifically, a link has two ends, called anchors, and a direction. The link starts at its source anchor and points to its destination anchor. A common destination anchor is a Uniform Resource Locator (URL). When someone activates the link (e.g., by clicking on it with a mouse), their web browser will display the target of the link. If the target is a web page, the web page is displayed. If the target is not a web page, then, depending on the file type and on the browser and its plugins, another program can be activated to open the file.

The server 110 receives the email 120. As described in more detail below, the server 110 determines whether the domain name associated with the displayed link (also referred to herein as the link domain name) matches the domain name associated with the From email address (also referred to herein as the sender email address). If the two domain names don't match, then the server 110 classifies the link as including a potential phishing URL. In one embodiment, the server 110 transmits a notice 130 that the link contains a potential phishing URL to the user computer 125 simultaneous with (or before or after) the transmission of the email 120 to the user computer 125. Exemplary forms of the notice 130 include, but are not limited to, a text message in the email itself, a pop-up window, an audio message, another email message, a web page, highlighting or marking the link itself, etc.

As described in more detail below, in one embodiment the server 110 also compares the sender domain name and/or link domain name with a list of domain names 135 stored in one or more databases such as database 140. The server 110 can compare the sender domain name and/or link domain name with the list of domain names 135 as another check before determining whether the URL corresponding to the link domain name is a potential phishing URL. Although shown as an external database 140, the database 140 can be an internal memory (e.g., hard drive), an external memory, or a combination of internal and external memory.

Figure 2A:
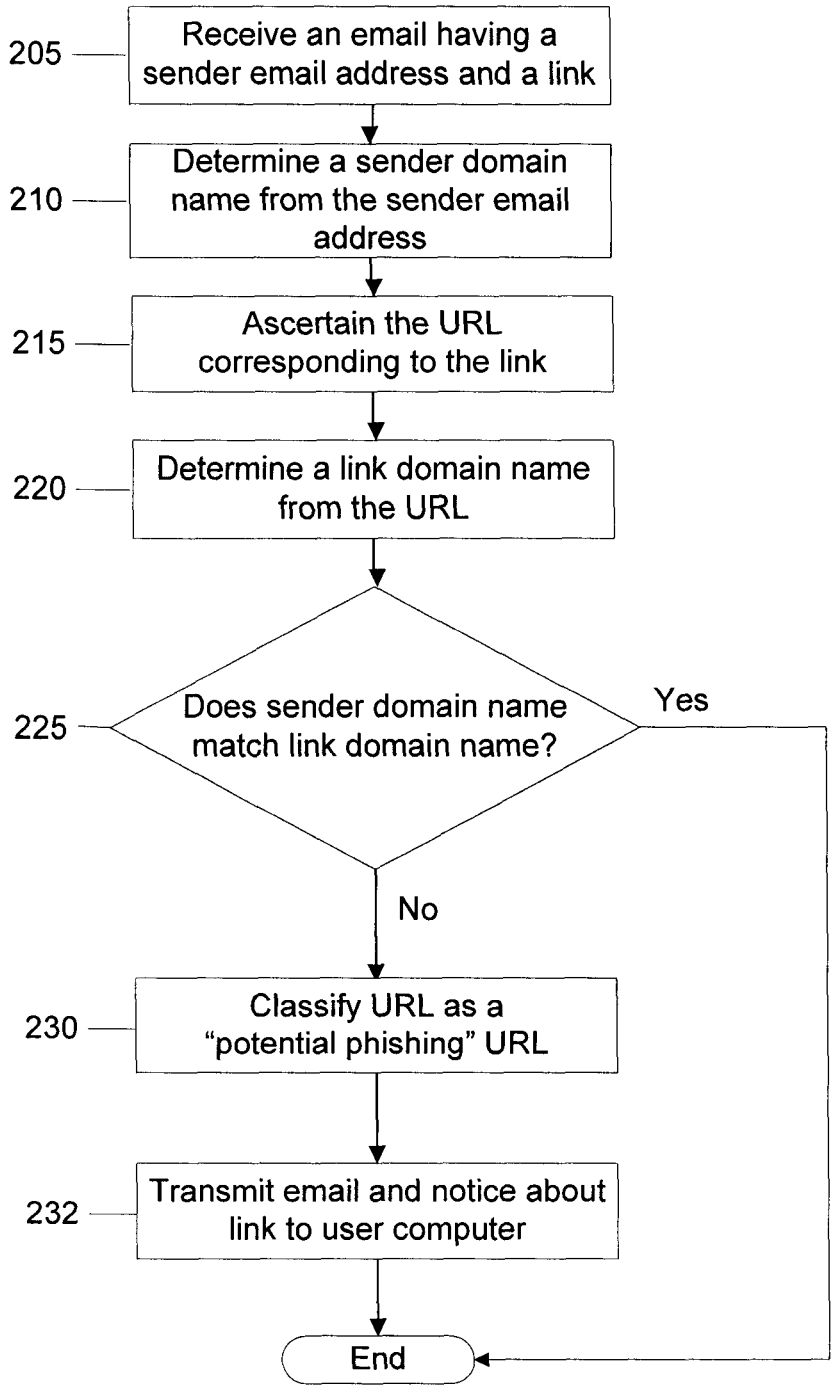
FIG. 2A shows a flowchart of the steps performed by the server of FIG. 1 in accordance with an embodiment of the present invention.

FIG. 2A shows an embodiment of a flowchart illustrating the steps performed by the server 110 to classify an email as having a potential phishing link. The server 110 receives the email 120 in step 205. As described above, the email 120 includes a sender email address (i.e., the From email address) and a link. For example, suppose the server 110 receives an email 120 having the following characteristics:

| From address: | jason@paypal.com |
| To address: | sally@usercomputer.com |
| Link displayed as: | PayPal Login Page |
| Underlying URL: | www.paypa1.com/loginpage.aspx |

In step 210, the server 110 determines the sender domain name from the From address of the email 120. In particular, the sender domain name is the term(s) after the @ symbol of the From address of the email 120. In this example, the sender domain name is "paypal.com".

The server 110 then ascertains the underlying URL corresponding to the link in the email 120. In this example, the URL is "www.paypal.com/loginpage.aspx". In one embodiment, the server 110 determines the URL corresponding to the link by examining the HyperText Markup Language (HTML) associated with the link. HTML requires the use of an anchor element to create a link. For example, the HTML code:

<a href="http://www.paypal.com/loginpage.aspx/">PayPal Login Page</a> will render the phrase "PayPal Login Page" as a link (which is typically underlined and in blue). An image can also be linked to another web resource (e.g., web page).

Thus, in one embodiment, the server 110 ascertains the underlying URL corresponding to the link by examining the text following the anchor tag. In the above example, the server 110 examines "www.paypal.com/loginpage.aspx" and determines a link domain name from the URL (step 220). Specifically, the server 110 determines that "www.paypal.com" is the domain name associated with the underlying URL "www.paypal.com/loginpage.aspx".

In one embodiment, the server 110 also examines the QUERY portion of the underlying URL, if present, to determine the link domain name in step 220. As a brief background, when a web page is requested from a server such as server 110 via HTTP (such as when a link is followed), the server locates a file in its file system based on the requested URL. This file is either a regular file or a program. If the file is a program, the server can (depending on its configuration) execute the program, sending its output as the requested web page. The QUERY portion of the URL is a part of the URL that is passed to the program. Its use permits data to be passed from the HTTP client (e.g., a web browser on user computer 125) to the program which generates the web page. A typical URL containing a QUERY portion is as follows:

http://server/path/program?query_portion

When a server (server 110) receives a request for such a page, the server (server 110) executes a program and passes the QUERY portion unchanged to the program. The question mark is used as a separator and is not part of the QUERY portion. In one embodiment, the server 110 examines any substring that resembles a domain name in the QUERY portion (e.g., query_portion) of the URL (with and without decoding) to determine the link domain name in step 220.

The server 110 then determines in step 225 whether the sender domain name matches the link domain name. In the above example, the server 110 determines that "www.payp-al.com" does not match "www.paypal.com" because the link domain name has the number one instead of the letter "l" at the end of the domain name. If the link domain name does not match the sender domain name (as in this example), the server 110 classifies the URL "www.paypal.com/loginpage.aspx" as a "potential phishing" URL in step 230. The server 110 can then transmit the email 120 to its destination. In this example, the server 110 transmits the email 120 to the To address "sally@usercomputer.com".

Suppose Sally uses the user computer 125 to read the email 120. In one embodiment, the server 110 transmits notice 130 to the user computer 125 along with or after (or before) transmitting the email 120 (step 232). As described above, the server 110 can provide this notice by highlighting the link in the email 120 and then by displaying text indicating that the highlighted link may be associated with a potential phishing URL. If the user of the user computer 125 (e.g., Sally) follows (e.g., clicks on) the link, in one embodiment the server 110 transmits a confirmation web page to the user computer 125. The confirmation web page can display, for example but without limitation, one or more of the following: (1) the difference(s) between the sender domain name and the link domain name; (2) a suggestion that the user (e.g., Sally) goes to the official website by using a known secure bookmark or by typing in the correct web address manually; and/or (3) a checkbox for the user to acknowledge that the user is taking the risk and responsibility by following the questionable link.

Figure 2B:
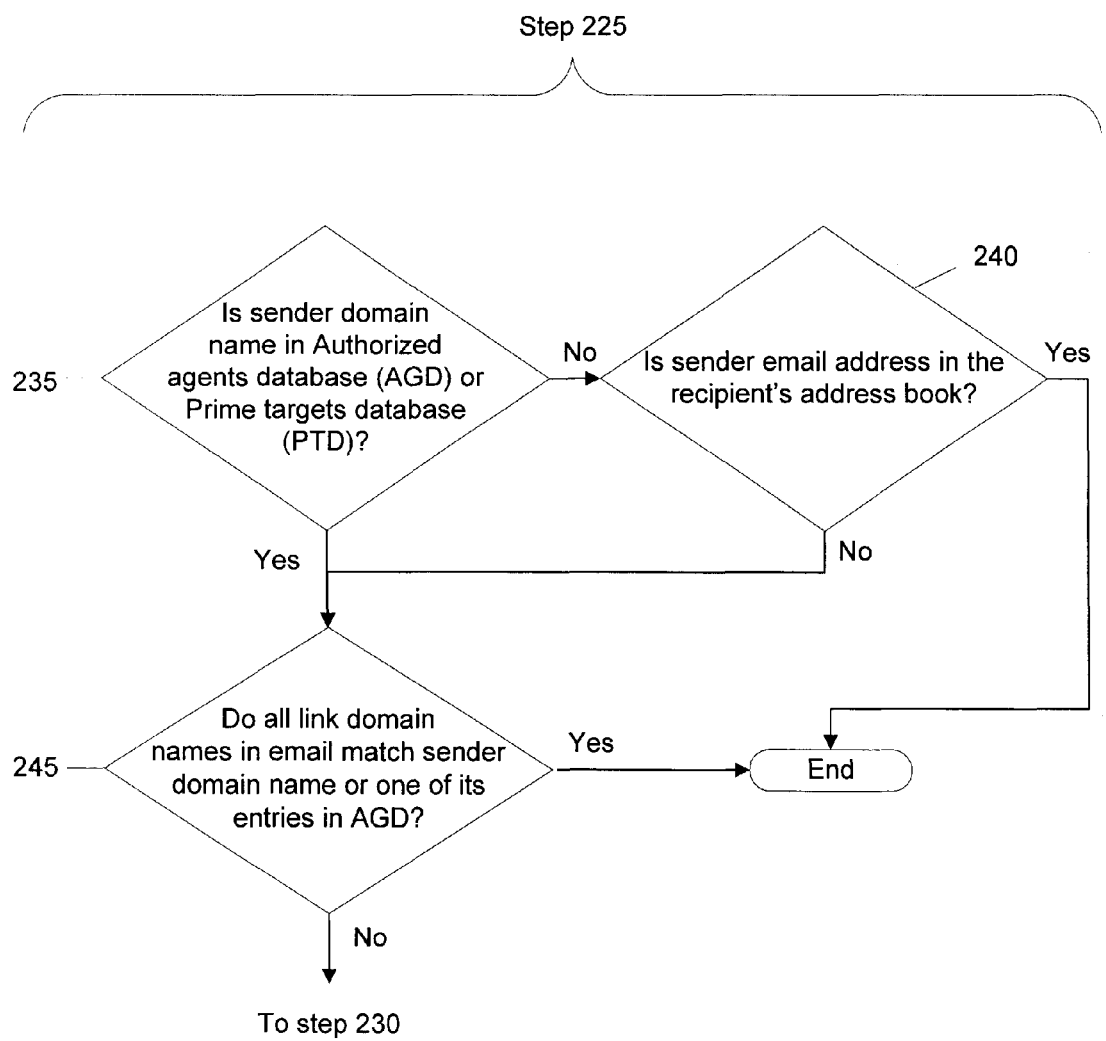
FIG. 2B shows a flowchart of additional steps performed by the server of FIG. 1 in accordance with an embodiment of the present invention.

FIG. 2B shows a flowchart of an embodiment of the steps performed by the server when executing step 225 of FIG. 2A. As described above, the server 110 can communicate with one or more database 140. The database 140 can include, for example, an authorized agents database (AGD) and/or a prime targets database (PTD).

The AGD is a database that stores a list of email addresses (each having a corresponding domain name) associated with authorized agents who can send emails having a link to a company's website. In one embodiment, the server 110 uses the AGD to store information on email marketers, or people who send emails about a particular company, such as advertisements for a company's products. For example, the server 110 can obtain, via, for instance, a web form, an email marketer's contact information (e.g., email address) and the company for which the email marketer works. The server 110 can examine a link in an email if the sender domain name of the email is in the AGD because the AGD contains information on people who are authorized to send emails with links to company websites.

The PTD can include domain names relating to prime phishing targets, such as financial institutions. In one embodiment, the server 110 can also store common variations of the domain names relating to prime phishing targets. For example, the server 110 can also store "paypa1.com" (i.e., a one at the end of the word instead of the letter "l") when "paypal.com" (the official domain name) is stored. The server 110 can additionally store the domain names of the web pages where the users of these websites can login. If a domain name is stored in the PTD, then the server 110 can examine links to these domain names when the links show up in an email because they are associated with prime phishing targets.

In one embodiment, the server 110 compares the sender domain name to the list of domain names in the AGD and/or the PTD in step 235. If the sender domain name is found in the PTD, then the server 110 examines the links in the email 120 because the sender's domain name is associated with a prime phishing target. In one embodiment, the server 110 compares the sender domain name with the domain names found in the PTD by performing substring matching. If the sender domain name is in the AGD, then the server 110 examines the links in the email 120 because the sender's domain name matches an authorized email marketer's domain name and so the links in the email 120 should link to a company's official website associated with the email marketer in the AGD. In a further embodiment, the server 110 additionally checks domain names that are similar to the sender domain name (e.g., the sender domain name with spelling errors) against the AGD and/or PTD.

If the sender domain name is not in the AGD or PTD, then the server 110 determines whether the sender email address is in the recipient's address book in step 240. If so, then the server 110 does not classify the email 120 as containing a potential phishing URL. If not, then execution progresses to step 245.

In step 245, the server 110 determines whether all link domain names in the email 120 match the sender domain name or one of its entries in the AGD. If not, then the server 110 continues with step 230 from FIG. 2A. If so, then the server 110 does not classify the email 120 as a potential phishing email.

In one embodiment, to help people distinguish between a phishing website and an official website, the server 110 stores websites such as login pages that are prime targets of phishers. For example, for every domain name stored in the PTD, the server 110 can additionally store the login page associated with the web site corresponding to each stored domain name in the PTD. When the server 110 receives the email 120, the server 110 can download the web page associated with the link domain name and compare this web page with the stored login page. In one embodiment, the server 110 can display the differences between the two web pages as part of the confirmation web page (as described above) or as part of the notice 130 about the link (and thus before the user actually clicks on the questionable link).

The description herewith describes the present invention in terms of the processing steps required to implement an embodiment of the invention. These steps can be performed by an appropriately programmed computer, the configuration of which is well known in the art. An appropriate computer can be implemented, for example, using well known computer processors, memory units, storage devices, computer software, and other components. A high level block diagram of such a computer is shown in FIG. 3. Computer 302 contains a processor 304 which controls the overall operation of computer 302 by executing computer program instructions which define such operation. The computer program instructions can be tangibly stored in a storage device 312 (e.g., magnetic or optical disk) and loaded into memory 310 when execution of the computer program instructions is desired. Computer 302 also includes one or more interfaces 306 for communicating with other devices (e.g., locally or via a network). Computer 302 also includes input/output 308 which represents devices which allow for user interaction with the computer 302 (e.g., display, keyboard, mouse, speakers, buttons, etc.).

One skilled in the art will recognize that an implementation of an actual computer will contain other components as well, and that FIG. 3 is a high level representation of some of the components of such a computer for illustrative purposes. In addition, the processing steps described herein can also be implemented using dedicated hardware, the circuitry of which is configured specifically for implementing such processing steps. Alternatively, the processing steps can be implemented using various combinations of hardware, firmware and software.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   receiving, by a computer, an email comprising a sender email address and a link;
   determining, by the computer, a sender domain name from the sender email address;
   storing, by the computer, a sender login web page associated with the sender domain name, the sender login web page comprising a web page in which a user enters a username and password;
   ascertaining, by the computer, a Uniform Resource Locator (URL) corresponding to the link of the email;
   determining, by the computer, a link domain name from the URL;
   comparing the sender domain name to the link domain name;
   determining, by the computer, that the sender domain name is different than the link domain name;
   retrieving, by the computer, a link login web page associated with the link domain name, the link login web page comprising a web page in which a user enters a username and password;
   determining, by the computer, whether the sender login web page is different than the link login web page; and
   classifying the URL as a potential phishing URL based on the determining whether the sender login web page is different than the link login web page.

2. The method of claim 1, further comprising determining that the sender domain name is found in a stored list of domain names.

3. The method of claim 2, further comprising determining that the link domain name is found in the stored list of domain names.

4. The method of claim 1, wherein the receiving an email comprising a sender email address and a link further comprises receiving an email comprising a sender email address, a link, and a recipient email address.

5. The method of claim 4, further comprising:
   determining that the sender domain name is not found in a stored list of domain names;
   determining that the sender email address is not found in an address book associated with the recipient email address; and
   determining that the link domain name does not match the sender domain name and is not found in the stored list of domain names.

6. The method of claim 4, further comprising transmitting the email to the recipient email address.

7. The method of claim 6, further comprising indicating to a computer displaying the email that the link in the email has a potential phishing URL.

8. The method of claim 7, further comprising transmitting a confirmation web page to the computer when a user associated with the recipient email address clicks on the link in the email.

9. The method of claim 8, wherein the transmitting a confirmation web page further comprises transmitting a confirmation web page displaying differences between the sender login web page and the link login web page.

10. The method of claim 8, wherein the transmitting a confirmation web page further comprises transmitting a confirmation web page displaying differences between the sender domain name and the link domain name.

* * * * *